Patented Sept. 11, 1934

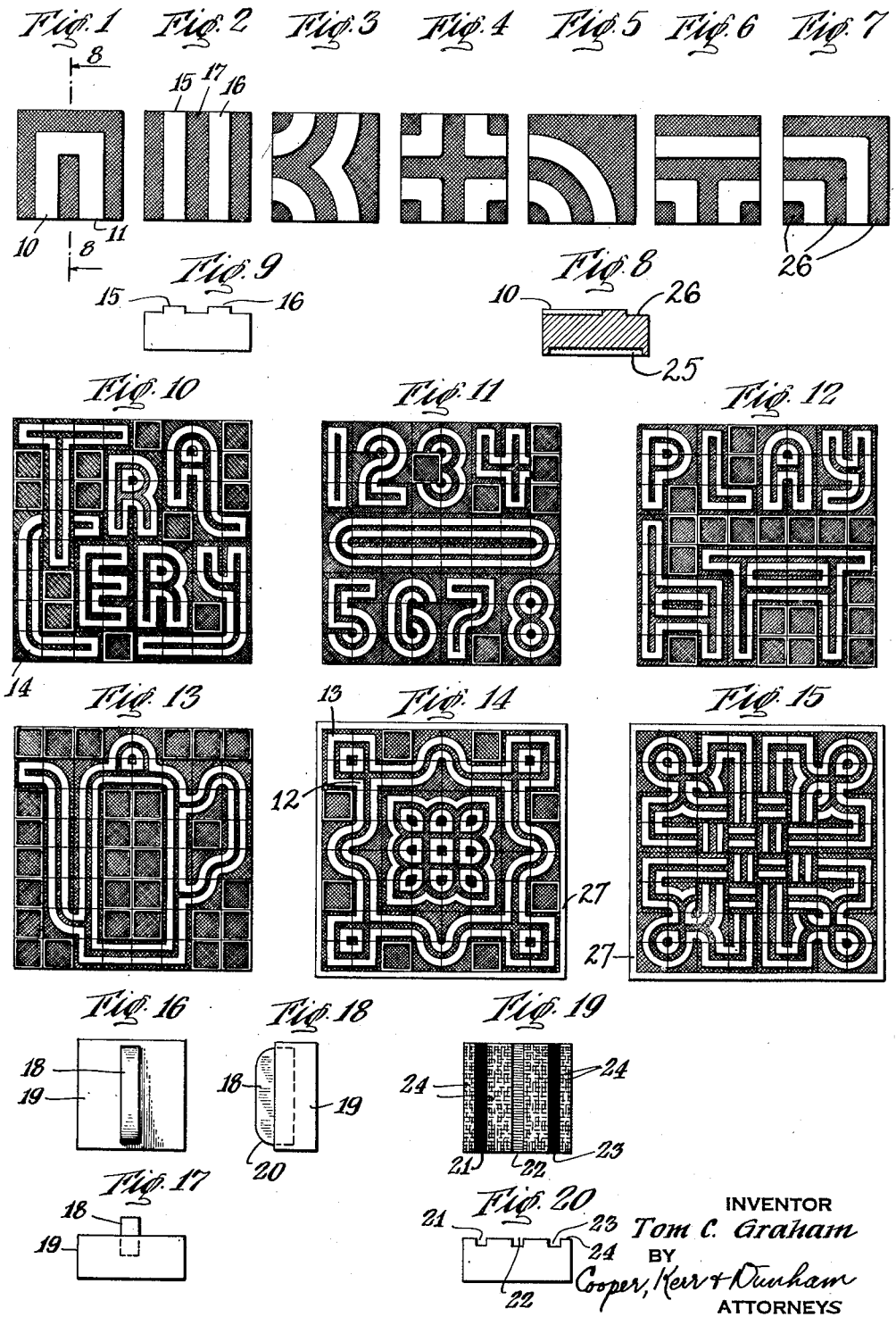

1,973,564

UNITED STATES PATENT OFFICE 1,973,564

TOY DESIGNING BLOCK

Tom C. Graham, Albany, N. Y., assignor to The Embossing Company, Albany, N. Y., a corporation of New York Application May 13, 1932, Serial No. 611,102

5 Claims. (Cl. 35—12)

This invention relates to blocks or like articles for enabling production of lineal designs.

Among the objects of the invention is to provide a set of blocks with which different designs may be produced by the selective arrangement of various blocks. The blocks have lineal markings of a simple form which may be assembled together to produce a predetermined design or an entirely fanciful design created and suggested only during the assembling of the various blocks and as the building up of the design advances. While many blocks are used in a single design or as a background therefor, there are relatively few different patterns or markings upon the blocks and in contradistinction to puzzle and picture blocks the blocks themselves are practically devoid of suggestion of the many possible different designs obtainable therewith.

The invention contemplates, among its objects, a set of blocks with which a large variety and many classes of designs may be created including figures, letters, general outlines, filigree, mosaic, weaving and other ornamental patterns.

Another object of the invention is to provide a toy capable of developing originality and imagination while, at the same time, contributing entertainment; also to provide a set of pieces by which a designer may devise innumerable patterns or outlines; and also to provide means suitable for the use of Braille students for entertainment and useful designing purposes.

Other objects involving novel features will appear in the specification and in the claims thereof, setting forth a preferred embodiment of my invention which may be fully understood from the detailed description and drawing in which:—

Figs. 1 to 7 inclusive show the plans of seven different blocks, or pieces, which are included in the set of blocks which have been made use of to produce the several designs illustrated in Figs. 10 to 15 inclusive.

Fig. 8 is a section on line 8—8 of Fig. 1.

Fig. 9 is a view from the lower edge of Fig. 2.

Fig. 10 illustrates lettering made by the use of blocks similar to those illustrated in Figs. 1 to 9 inclusive.

Fig. 11 illustrates a closed track and numerals.

Fig. 12 illustrates lettering and pieces of furniture.

Fig. 13 illustrates a tea-pot.

Fig. 14 illustrates a simple design.

Fig. 15 illustrates another design including an under and over appearance of crossing lines.

Fig. 16 is illustrative of another form of block having a single strip of material as a marking.

Fig. 17 is an end view taken from the lower edge of the block illustrated in Fig. 16.

Fig. 18 is a side view of the block illustrated in Fig. 16.

Fig. 19 is still another form of block, and

Fig. 20 is an end view taken from the lower edge of the block illustrated in Fig. 19.

The various pieces constituting the set of blocks of my invention may be made of any suitable material such as wood, paper, composition and other materials capable of retaining form, and the various markings upon the surfaces of the blocks may be painted or applied in a manner to contrast with the background or upper surface of the blocks. The number of lineal markings upon a block is optional and I have chosen a simple marking consisting of two parallel lines for illustrating applications of the invention.

While it is to be appreciated that the number of different individual markings may be varied depending upon the complexity of the set of blocks which it is desired to have, I have illustrated in Figs. 1 to 7 inclusive, enough different forms to afford a wide range of usefulness and the making of a large number of different outlines and patterns. Preferably, each of the blocks or pieces has the same dimensions so that any edge of one piece can be placed adjacent to and cover any edge of another piece. Although two or more of the blocks illustrated may be made integral and thus provide a special piece, I prefer the subdivision of the various blocks into pieces of equal size for by this method it is possible to produce a greater variety of different designs with the same number of blocks.

It will be apparent from inspection of the various designs which have been illustrated, that the lineal markings may be said to constitute a single continuous line or parallel lines which in some cases are closed at their ends by a loop or straight line. I prefer to make each individual block in one piece and to accomplish this I emboss a piece of wood and cause the lineal markings to appear upon the surface or background of the block either as troughs or as ridges.

As may be seen in Figs. 1 and 8, the parallel lines 10, 11 on the blocks are raised from the surface or background of the block. These lines or markings extend to one edge of the block and are connected so as to form a loop within the area of the block. Three of such blocks are shown in the letter "E" appearing on the design reproduced in Fig. 10. In Fig. 2 the two markings 15, 16 extend across the surface of the block from one edge to the opposite edge. Such blocks may be used to produce markings continuing over a series of blocks placed end to end, in a manner as illustrated by three of such blocks forming a part of the vertical portion of letter "C" in Fig. 10.

It is a feature of the present invention that however the markings are applied to the blocks, the spacing and widths of the markings are the same for all the blocks so that when two blocks are placed together the markings thereon may be made to register with one another and produce a continuous line over both blocks.

The markings of the blocks illustrated in Figs. 3 and 6 are in the form of a T and have similar uses except that the markings for the block in Fig. 3 are curvilinear and the markings for the block in Fig. 6 are rectilinear. The markings of the block in Fig. 4 meet in the form of a cross and such a block may be used to show intersecting lines as at 12 in Fig. 14. The markings on the block illustrated in Figs. 5 and 7 produce right angle turns; for example, four blocks similar to the one illustrated in Fig. 5 may be used to reproduce a closed circle, and four blocks similar to the one illustrated in Fig. 7 may be used to produce a closed square. Either of the blocks may be used as a corner block for continuing lines at right angles to each other, as illustrated at 13 in Fig. 14 and at 14 in Fig. 10.

It will be apparent from a casual inspection of the blocks illustrated in Figs. 1 to 7 inclusive, that the blocks themselves do not suggest any particular design although it is apparent that one block may be joined to another for delineating an outline or design. Their attractiveness resides, therefore, in the many possibilities which present themselves to one having a set of such blocks. In Fig. 10 lettering of different forms has been illustrated and Fig. 13 has been included herein for the purpose of giving an idea how an outline of an article may be obtained.

It will be noticed that there are fewer blocks with lineal markings appearing in Fig. 13 than in Fig. 15 although the block assemblies for both of these designs are of the same size and include the same number of blocks, namely, sixty-four. I prefer to design the individual blocks so as to provide on their reverse sides surfaces finished to correspond with the areas bordering the lineal markings on the upper surface of the blocks. By inverting a block a plain background corresponding to the background of the markings on individual blocks may be produced, such as is illustrated by the ten blocks within the area of the body of the tea-pot illustrated in Fig. 13.

The finish of the background or of the area of the block bordering the lineal markings may be plain or decorated, although for ordinary purposes it should contrast with the lines of the pattern. The raised markings on the blocks illustrated in Figs. 1 to 15 inclusive are smooth and painted in color whereas the bordering areas are checkered and black. However, for Braille students it will be sufficient that the markings be either raised from or depressed into the surfaces of the blocks.

It is to be understood that the lineal markings may constitute a single line or lineal area on a single block or may constitute a number of such lines or areas on a single block, that is to say, in the blocks illustrated, by way of example in Figs. 1 to 15 inclusive, the parallel portions 15, 16 (Fig. 2) or the central portion 17 constitutes lineal markings.

In Figs. 16 and 17, I have shown one block of a set of blocks having a single lineal marking. While this lineal marking may be a part of the block, another convenient method of constructing the block would involve the use of a strip 18 of a suitable material such as aluminum, celluloid or the like, inserted in a slot or pressed into a block 19. The exposed ends of the strips may be rounded as at 20, Fig. 18, so as to avoid a sharp corner capable of causing injury. Lineal designs over many blocks may be traced even though the lineal markings on individual blocks do not extend to the very edge of the block, and the block shown in Figs. 16, 17 and 18 is illustrative of this.

In Figs. 19 and 20 I have illustrated another style of block having three lineal markings 21, 22 and 23 impressed below the upper surface of the block. Whether impressed or not the lineal markings may be painted for contrasting or ornamental purposes and in Fig. 19 the areas designated 21 and 23 are indicated to represent black whereas the area designated 22 is indicated to represent blue. The background or bordering areas 24 are indicated to represent yellow, and the reverse side of the block would be yellow also. The grooves 21, 22 and 23 could be cut and the obverse and reverse sides may be roughened or plain faced.

Each of the blocks illustrated in Figs. 1 to 15 inclusive, has a recess 25 on its under surface or reverse side. This is characteristic of the particular manufacturing method utilized for producing the blocks and the relief on its upper surface. The checkering 26 and the lineal markings are left on the upper surfaces of such blocks by an embossing operation during which the recesses 25 are impressed, but, if desired, blocks may be produced by embossing having plain flat surfaces as their obverse and reverse sides, except for the lineal markings.

It is to be appreciated that the set of blocks is not limited in number of blocks, that is to say, the invention is suitable for adaptation in a set of twenty-five blocks, as well as in a set of two hundred and twenty-five blocks, and the ultimate outline of the background of an assembly of blocks likewise has no limiting qualifications in the usefulness of the invention. In Figs. 10 to 15 inclusive, I have illustrated designs on backgrounds which involve the use of sixty-four different pieces. The number of blocks and shape of the assembly of blocks is merely illustrative, and a user might have at his disposal a hundred blocks, more or less, although he has in mind but a small design. If desired, an edged tray 27 such as is shown in Figs. 14 and 15 may be made use of, but although it is helpful, it is not indispensable.

I claim:

1. In combination, a set of blocks with which different lineal designs comprising letters, numerals and geometrical figures may be outlined upon a plain background by selective arrangement and placing of the blocks in respect to each other, the blocks having upon their upper faces plain surfaces with lineal markings thereon capable of registering in prolongation of one another to form a lineal design continuing over a plurality of juxtaposed blocks and consisting of raised portions which are of uniform height and width for all of the blocks, the raised portions being elongated and within the face areas of the blocks except where they come to marginal edges of the blocks to which they extend, the places to which the lineal markings come being symmetrically positioned in respect to the centers of such marginal edges so as to enable registration of the raised portions on different blocks at meeting edges of juxtaposed blocks to give a lineal design upon a plain background disposed along both sides of the lineal markings.

2. In combination, a set of blocks comprising blocks which may be used by Braille students for forming different lineal designs including letters, numerals and geometrical figures by the selective placing of the blocks in different juxtaposed relations, said blocks having upon their surfaces lineal markings consisting of elongated areas which are bordered by planes extending from the surfaces of the blocks, certain of said blocks having lineal markings extending to but one edge of a block, others of said blocks having the lineal markings extending to opposite edges of the blocks and others of the blocks having lineal markings extending to adjacent edges of the blocks, the lineal markings upon all of the blocks being of equal widths and within the surfaces of the blocks except where they come to the marginal edges, the extremities of said lineal markings being symmetrically positioned in respect to the centers of the marginal edges to which they come so as to enable registration thereof when the blocks are juxtaposed and such marginal edges are contiguous to one another.

3. In combination, a set of blocks comprising blocks having upper faces bearing lineal markings disposed upon a plain background, the lineal markings being within the surface areas of the blocks, but terminating with their ends at the marginal edges of the blocks, certain of said blocks having lineal markings extending to but one edge of a block, others of said blocks having the lineal markings extending to opposite edges of the blocks and others of the blocks having lineal markings extending to adjacent edges of the blocks, said lineal markings being elongated and positioned on the blocks with their ends terminating at the same place upon all of the blocks so that the lineal markings will register with one another when the blocks are selectively assembled in registering relation and will delineate upon a plain background any one of several different figures, such as letters, numerals and geometrical figures, in a lineal outline continuing across the assembled blocks.

4. In combination, a set of blocks comprising blocks capable of being selectively arranged in different juxtaposed relation to produce different figures delineated in lineal outline upon a plain background, all of said blocks being provided with like plain surfaces for forming a plain background when the blocks are juxtaposed and each of said blocks having upon its surface a lineal marking, said lineal marking being formed by two equi-spaced lines bordering a lineal area therebetween and coming to at least one marginal edge of the block at a place mid-way between the opposite ends of the marginal edge so that the selective juxtaposing of any two blocks and the meeting of the marginal edges to which the lineal markings come results in bringing into registration the lineal markings upon the blocks and an accompanying lineal outline consisting of the lineal markings continuing over the juxtaposed blocks.

5. In combination, a set of blocks comprising blocks capable of being selectively arranged in different juxtaposed relationship to produce different figures delineated in lineal outline over the several juxtaposed blocks, each of said blocks having a lineal marking which is elongated and comes to at last one marginal edge of the block at a place midway between the ends of the intersected marginal edge so as to cause registration of the lineal markings upon several blocks when the blocks are juxtaposed with the marginal edges to which the lineal markings come facing one another, said lineal markings being of the same width for all of the blocks and normal to the marginal edges which they intersect at the place of intersection so that when such marginal edges are placed contiguous to one another as the blocks are juxtaposed the lineal markings will register with one another and form a lineal outline which is continuous over several juxtaposed blocks and crosses the marginal edges of blocks in directions normal to the marginal edges at places of crossing.

TOM C. GRAHAM.